Figure 1:
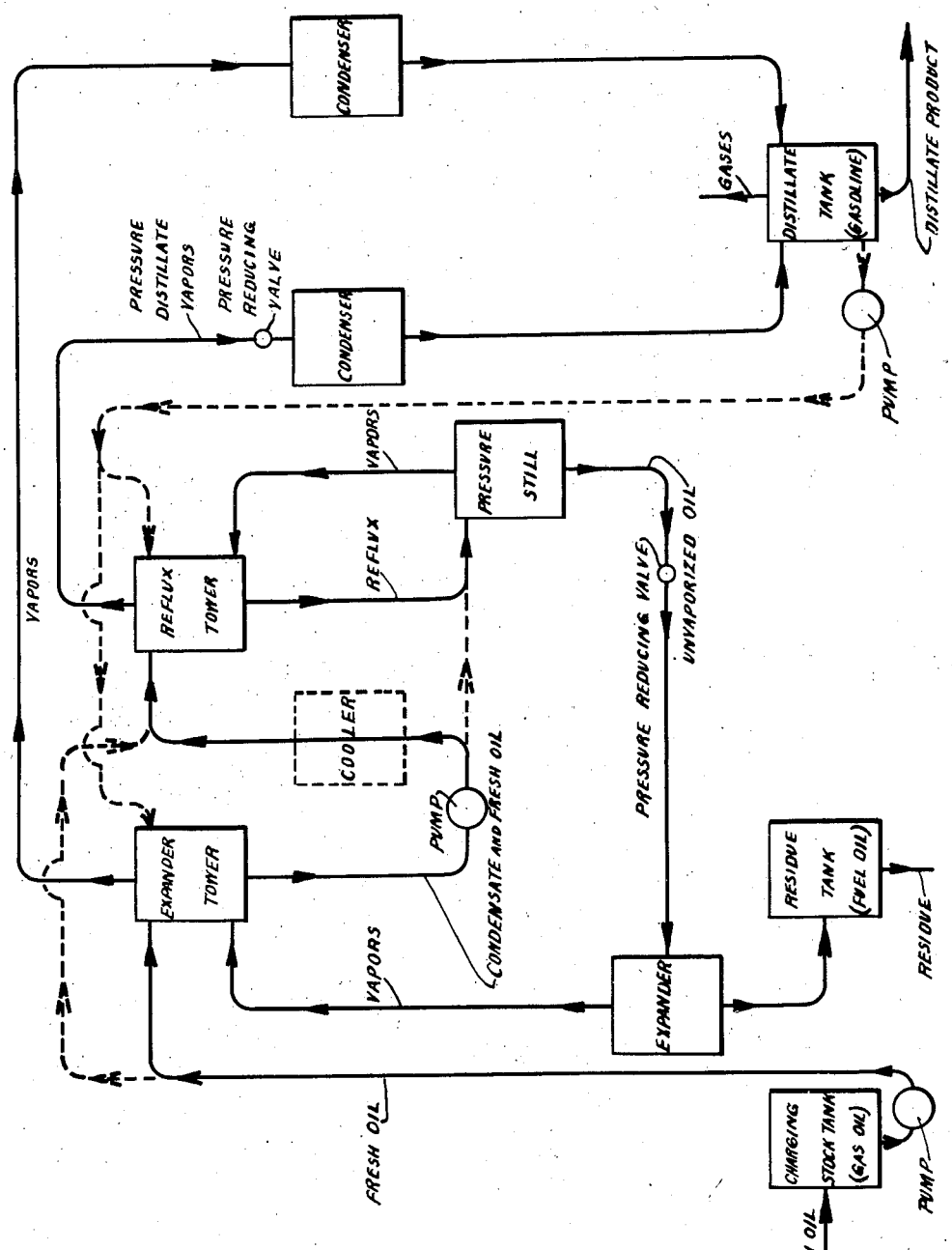

July 17, 1928.

E. C. HERTHEL ET AL 1,677,773

ART OF CRACKING HYDROCARBON OILS

Filed June 22, 1926  2 Sheets-Sheet 2

INVENTOR
Eugene C. Herthel
Thomas d'C. Tifft
BY
ATTORNEYS

Patented July 17, 1928.

1,677,773

UNITED STATES PATENT OFFICE.

EUGENE C. HERTHEL AND THOMAS DE COLON TIFFT, OF CHICAGO, ILLINOIS, ASSIGNORS TO SINCLAIR REFINING COMPANY, OF NEW YORK, N. Y., A CORPORATION OF MAINE.

ART OF CRACKING HYDROCARBON OILS.

Application filed June 22, 1926. Serial No. 117,897.

This invention relates to improvements in the cracking of higher boiling hydrocarbon oils, such as gas oil, to produce therefrom lower boiling hydrocarbon oils, such as gasoline and pressure distillate.

This invention relates particularly to improvements in operations in which hydrocarbon oils are cracked by distillation under pressure and in which residual oil withdrawn undistilled from the pressure distillation is expanded at a lower pressure for the further separation of oil constituents as vapors therefrom. The invention has several important advantages in heat economies, in features of control, and in the maintenance of conditions which permit prolongation of the useful period of operation without sacrifice of efficiency. The invention is of special value and application in connection with the operation of pressure cracking stills of the type described in Patent No. 1,285,200 issued November 19, 1918, to the Sinclair Refining Company on an application to Edward W. Isom, and it will be described particularly in connection therewith, but in certain aspects it has advantages which are of more general application.

In carrying out the present invention, the oil to be cracked is subjected to distillation under pressure at a cracking temperature in a pressure still, the vapors driven off from the still are subjected to a refluxing operation in a reflux tower from which reflux is returned to the still, and the vapors remaining uncondensed from the refluxing operation are condensed to form the distillate product. The operation is carried out in a continuous manner by supplying fresh oil to the pressure still charge and withdrawing unvaporized oil containing the pitch formed by cracking during the operation and regulating the rate of supply of fresh oil and the rate of withdrawal of pitch-laden oil so that the concentration of pitch in the still charge is kept below the saturation point. The pitch laden oil withdrawn from the still charge is expanded by reducing the pressure thereon and is thereby separated into an unvaporized residue and an oil fraction driven off as vapors. The pitch content of the unvaporized oil withdrawn from the pressure still charge is separated in this residue and the oil components of the withdrawn material, or the greater part of them, are separated as vapors, this separation advantageously being effected simply by the heat contained in the pitch-laden oil from the pressure still.

In accordance with the present invention, the oil vapors separated from the pitch-laden oil withdrawn from the pressure still are passed through a tower into which fresh oil to be supplied to the pressure still is passed in direct contact with these vapors. The fresh oil is thus heated and the vapors are cooled. The heavier components of the vapors are condensed and together with the unvaporized components of the fresh oil are then introduced into direct contact with the vapors in the refluxing operation to which the vapors driven off from the pressure still are subjected. In the tower through which the vapors separated from the unvaporized oil withdrawn from the pressure still are passed, lighter constituents such as those suitable as components of the distillate product remain uncondensed and, together with any similar constituents contained in the fresh oil supplied to this tower, are withdrawn and separately condensed.

The condensate and admixed fresh oil withdrawn from the second tower, the tower through which the vapors separated from the unvaporized oil withdrawn from the pressure still are passed, are advantageously returned to the pressure still in a heated state, either as withdrawn from the tower or partially cooled, or they may be returned after cooling approximately to atmospheric temperature. This mixture when introduced hot into the reflux tower through which the vapors from the pressure still are passed is usually insufficient alone to maintain the desired refluxing action therein, and to this end the reflux tower may be supplied with some supplemental cooling or refluxing agent. A part of the condensed pressure distillate, or some similar light fraction, may with advantage be introduced into the reflux tower on the pressure still, best at a point above the point of introduction of the mixture from the second tower, to maintain the escaping vapors at the desired temperature and to control the refluxing operation. Or, the mixture introduced into the reflux tower on the pressure still may be cooled sufficiently so that it has in the reflux tower the desired refluxing action and can maintain the temperature of the escaping vapors at the desired point. In either of these operations, a part of the heat of the vapors separated from the unvaporized oil withdrawn from the pressure still is returned directly to the pressure still in a particularly advantageous way.

In addition to that part of the mixture introduced into the reflux tower on the pressure still, part of it may be introduced into the pressure still directly, and so much of the mixture as is so returned may with advantage be returned at substantially the temperature at which it is withdrawn from the second tower. The part introduced into the reflux tower on the pressure still may in this case be cooled or its refluxing action may be supplemented by that of another refluxing agent in the way that has been described. In addition to the fresh oil supplied to the second tower, part of the fresh oil to be supplied to the operation may be introduced directly into the reflux tower on the pressure still.

The operation of the tower, through which the vapors separated from the unvaporized oil withdrawn from the pressure still are passed, is advantageously controlled so that the vapors escaping uncondensed therefrom correspond in character to the pressure distillate escaping as vapors from the reflux tower on the pressure still. These vapors may then be condensed and collected together with the pressure distillate from the pressure still as part of the desired distillate product. This control of the operation of the second tower may be effected by regulating the rate at which fresh oil is supplied thereto, if the amount of fresh oil required to be supplied to the pressure still operation is at least sufficient to effect the necessary condensation, but usually it is advantageous to employ in addition to the fresh oil some supplemental condensing agent. One particularly advantageous way of controlling the operation of this tower is to return and introduce into the tower, best at a point above the point of introduction of the fresh oil, a part of the pressure distillate in amount regulated so that the vapors escaping are of the desired character. The pressure distillate, or similar fraction, supplied to the tower to effect the control in this way is substantially completely revaporized escaping with the vapors from the tower to be condensed therewith.

Fig. 1 of the accompanying drawings is a pictorial representation of the operation of the process of the invention. The invention will be further described in connection with Fig. 2 of the drawings which illustrate, in a diagrammatic and conventional manner, an apparatus adapted for carrying out the process of the invention.

Figure 2:
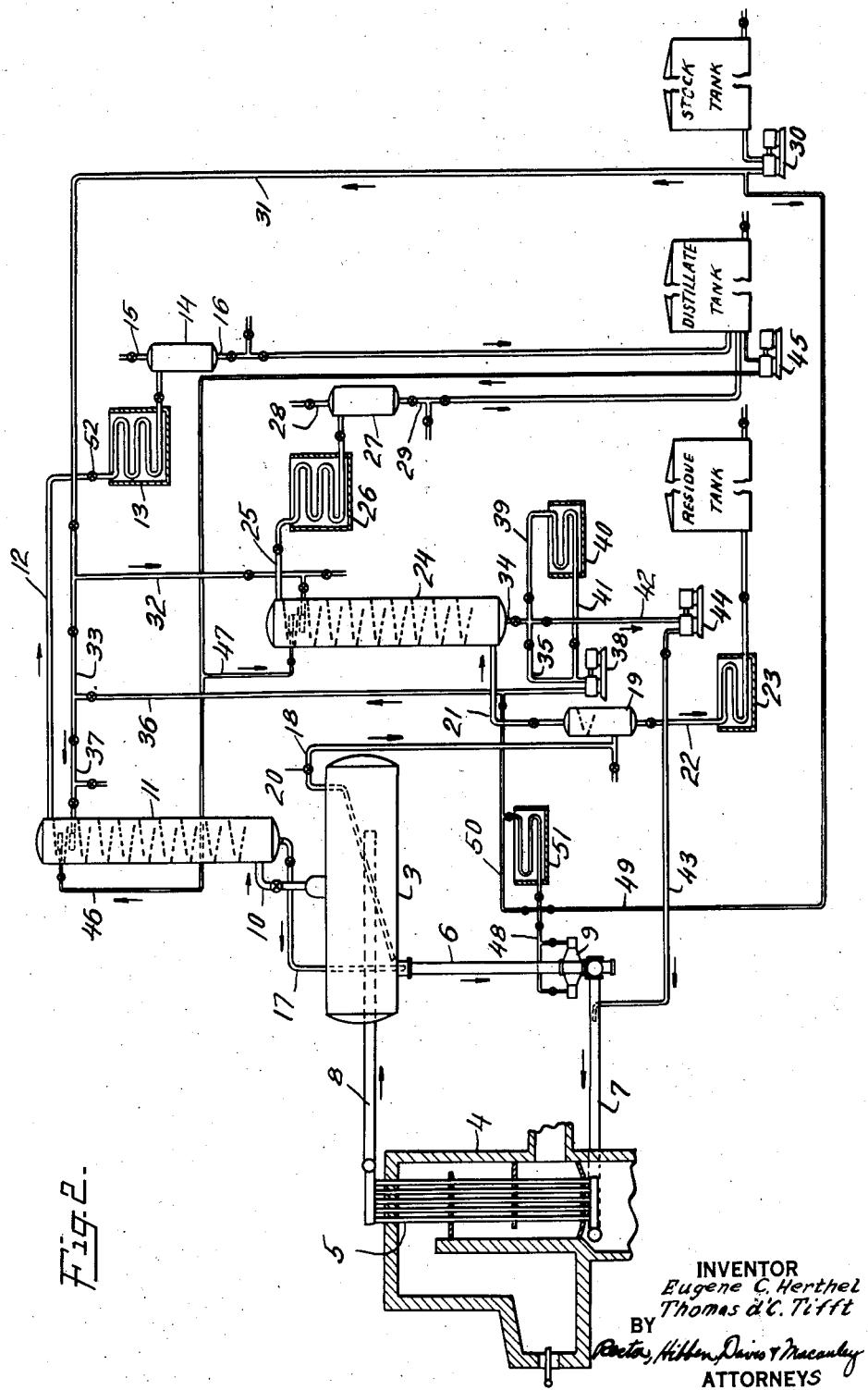

Referring to Fig. 2 of the drawings, the pressure still illustrated is of the type described in Patent No. 1,285,200, referred to above. The pressure still comprises a bulk supply tank 30 located away from the heating furnace 4, a battery of vertical heating tubes 5 arranged in the heating furnace, and circulating connections 6, 7 and 8 and a circulating pump 9 arranged to withdraw oil from the bulk supply tank and force it upwardly through the heating tubes and back to the bulk supply tank. Vapors from the bulk supply tank escape through connection 10 and pass upwardly through the reflux tower 11, uncondensed vapors escaping from the upper end of the reflux tower through connection 12 to the condenser 13 in which they are condensed, the condensate collecting in receiver 14. A connection 15 is provided for the discharge of uncondensed vapors and gases and a connection 16 for discharge of the condensate. Reflux, and any admixed unvaporized oil introduced into the reflux tower, are returned from the reflux tower 11 to the circulating line connecting the bulk supply tank with the suction side of the circulating pump through connection 17. Unvaporized oil is withdrawn from the bulk supply tank 3 through connection 18 arranged to discharge into the expander 19. A pressure reducing valve 20 is provided in the connection 18, advantageously at a point adjacent the pressure still, to control and reduce the pressure between the bulk supply tank and the expander. To promote vaporization, steam, or other heated gaseous medium, may be introduced into the expander 19, for example, steam may be injected into and admixed with the oil as it enters the expander. As little as 1% of steam will, in many cases, materially increase the amount of vaporization over any particular pressure drop. To inhibit entrainment, several baffles or other suitable means are arranged in the upper end of the expander 19. Vapors escape from the expander through connection 21 and unvaporized material is discharged through connection 22 to the cooler 23. The vapors from the expander pass upwardly through the expander tower 24, uncondensed vapors escaping from the upper end of the tower through connection 25 to the condenser 26 in which they are condensed, the condensate collecting in receiver 27 which is provided with a discharge connection 28 for uncondensed vapors and gases and connection 29 for the discharge of condensate. Fresh oil is supplied by means of pump 30 to the upper end of the expander tower 24 through connections 31 and 32. A part of the fresh oil so supplied may also be introduced into the upper end of the reflux tower 11 through connection 33. The condensate and admixed fresh oil collecting in the lower end of expander tower 24 is withdrawn through connection 34. This mixture may be introduced into the upper end of the reflux tower 11 through connections 35, 36 and 37 by means of pump 38; or through connection 39, the cooler 40 and connections 41, 36 and 37 by means of pump 38. A part of the mixture may be returned directly to the circulating connection supplying oil to the lower end of the heating tubes in the pressure still through connections 42 and 43 by means of pump 44. As a supplemental refluxing or condensing agent or controlling medium, a part of the distillate product can be reintroduced by means of pump 45 either into the upper end of the reflux tower 11 through connection 46 or into the upper end of expander tower 24 through connection 47. The hot parts of the apparatus as well as the hot connections are advantageously lagged or heat insulated to prevent heat loss, particularly the expander 19. To promote condensation therein the expander tower 24 may be left uninsulated, although control is somewhat facilitated if this tower is also insulated against heat loss.

In the apparatus illustrated, the circulating pump 9 is of the rotary impeller type and connections 48 are provided for forcing cool oil through the bearings to protect them from the high temperature of the hot oil passing through the pump at or near a cracking temperature. Simply to effect cooling but a relatively small amount of oil is required, or if desired a much larger proportion of the oil to be supplied to the pressure still can be introduced in this way. For example, fresh oil may be so supplied through connection 49, or part of the mixture collecting in the expander tower 24 may be so supplied through connection 50. If the temperature of the mixture from the expander tower is too high to provide sufficient cooling, it may be passed through cooler 51 on its way to the pump bearings.

In operation, the pressure still is charged with fresh oil and brought to cracking conditions of temperature and pressure. In a still of the type illustrated an initial charge of about 8000 gallons of cold oil, that is oil at a temperature of about 80° F. for example, is commonly employed. The pressure maintained during the operation is determined to a large measure by the stocks to be treated and the products to be obtained. With gas oil character charging stocks pressures up to 125 pounds per square inch or more may be used and with charging stocks containing large amounts of kerosene character components much higher pressures, say up to 300 pounds per square inch or more, may be used. When the still is brought to operating conditions the introduction of fresh oil through connection 37 is begun and pressure distillate vapors are discharged into the condenser and condensed, the pressure being regulated by valve 52 between the reflux tower and the condenser. The pressure may also be regulated, if desired, by valves beyond the condenser. During the initial period of operation, unvaporized oil is not withdrawn from the pressure still, or is withdrawn in but small amount, but before the pitch concentration in the charge of oil in the pressure still reaches the saturation point the withdrawal of pitch-laden oil in substantial amount is begun and the rate of withdrawal of pitch-laden oil and of supply of fresh oil is regulated to maintain the concentration of pitch in the pressure still charge below the saturation point. The pitch-laden oil withdrawn is discharged into the expander 19 where a pressure substantially lower than that prevailing within the pressure still is maintained, the pressure between the still and the expander being reduced by means of valve 20. Due to this reduction in pressure, the withdrawn pitch-laden oil is subjected to further vaporization, the vapors entering the expander tower and pitch components separating in a residue still remaining unvaporized. The degree of vaporization in the expander can be controlled by regulating the pressure therein. As much as 80% or more of the pitch-laden oil may be so vaporized by its self-contained heat, but if a liquid residue is to be obtained it is usually not desirable to go much beyond this point and it may be necessary to reduce the amount of vaporization, although a liquid residue can sometimes be obtained with vaporization of as much as 90% of the pitch-laden oil. Or if desired, the expander can be run to separate a coke or coky residue in which event a series of the expanders becomes necessary so that the operation can be carried out continuously, to permit cleaning and removal of the solid or semi-solid residue at the same time that the pitch-laden oil is being subjected to further vaporization under reduced pressure. With still pressures in the neighborhood of 100 pounds per square inch or higher, the pressure in the expander may be maintained at a value between atmospheric pressure and say 50 pounds per square inch or higher, depending on the amount of vaporization desired. When the withdrawal of pitch-laden oil is begun, and vapors from this oil begin to pass through the expander tower, the fresh oil, or part of it is introduced into the top of the expander tower through connection 32 and the oil introduced into the top of the reflux tower through connection 37 is supplied, in whole or in part, from the oil mixture withdrawn from the lower end of the expander tower. Part of this oil mixture may be supplied directly to the charge of oil circulating in the pressure still in addition to that introduced into the reflux tower.

Operating for the production of gasoline, or gasoline-containing pressure distillate, with a gas oil character charging stock, as an example of the operation of the invention, the temperature at the top of the reflux tower 11 may be maintained at about 550° F. and the temperature at the top of the expander tower 24 at about 350° F. The pressure distillate may be taken off at a rate, for example, of about 1000 gallons per hour and pitch-laden unvaporized oil withdrawn from the still charge at a rate of about 1500 gallons per hour, requiring the return to the pressure still of 2500 gallons of oil per hour to maintain the charge. The temperature of the oil as withdrawn from the pressure still, during operation under a pressure in the neighborhood of 100 to 125 pounds per square inch, may approximate 700° to 725° F., and on reduction to approximately atmospheric pressure up to about 80% or 1200 gallons per hour of this oil may be vaporized, the temperature of the vapors and of the residue escaping from the expander approximating 650° F., or upwards. Since part of this vaporized fraction of the oil withdrawn from the still charge escapes as vapors from the expander tower, fresh oil in amount upwards from 1300 gallons per hour is supplied. If all of this fresh oil is supplied through the expander tower, the temperature of the mixture collecting in the bottom of the expander tower may approximate 480° F., and since it is usually desirable to limit the temperature of the fresh oil introduced into the reflux tower to a value not exceeding about 275° to 280° F., to maintain adequate refluxing action and a head temperature approximating 550° F., this mixture or at least that part of it introduced into the reflux tower, is cooled to this temperature, or otherwise some supplementary refluxing agent is employed. Similarly, if part of this mixture is supplied to the bearings of the circulating pump 9 to protect them from the hot oil at cracking temperature, it is usually advantageous to cool it to about 200° F., or less. The supply of oil to the reflux tower 11 is regulated to maintain the desired head temperature, and oil necessary to be supplied to the still charge in excess of the amount introduced into the reflux tower is supplied to the still charge directly. The oil so supplied is advantageously returned at as high a temperature as is available. To maintain the desired head temperatures, part of the distilled product may be supplied to the upper ends of the reflux tower and the expander tower as required.

It will thus be seen that this invention provides an improved method of carrying out pressure distillation processes for cracking hydrocarbon oils which effects several heat economies. The separation of unvaporized oil withdrawn from the pressure distillation into a residue containing all of the pitch constituents of the withdrawn oil and a completely vaporized fraction is effected without requiring additional heat, and further at least a part of the heat of the fraction so vaporized is returned to the pressure distillation in a particularly advantageous way. This heat is absorbed in part in fresh oil which is brought in contact with the vapors forming this separated fraction, and is returned directly to the pressure still in the condensate produced from these vapors and in the heated fresh oil. Part of this heat may be given up in cooling of the mixture of fresh oil and condensate, but nevertheless some of it is returned and made usefully available in the cracking operation whereas otherwise it would be lost for this purpose. Heat so returned to the pressure distillation assists in prolonging the period over which the operation can be continued as it reduces to a corresponding extent the amount of heat necessary to be transferred through the walls of the pressure still in which the operation is carried out making possible lower furnace temperatures to effect any given conversion of a particular stock. Such lower furnace temperatures can be maintained efficiently by recycling part of the heating gases again over the heat transferring walls. With the withdrawal of substantial amounts of pitch-laden oil from the pressure distillation, the economy thus effected becomes particularly important. Likewise, in carrying out the invention, lighter constituents present in the oil withdrawn from the pressure distillation which if returned might be subjected to overcracking are separated before the condensate produced from the vapors separated from this oil under reduced pressure is returned to the pressure distillation and may be combined with the distillate product; and similarly lighter constituents present in fresh oil supplied to the operation, for example, gasoline character constituents present in coke-still gas oil charging stock due to the cracking intailed in the operation of the still to coke or gasoline character constituents absorbed in fresh charging stock by treating gas mixtures such as the uncondensed vapors and gases from pressure stills or coke-stills with the fresh oil, can be separated in a particularly advantageous way. If stocks containing such lighter components are supplied directly to the pressure still or to a reflux tower on the pressure still, heat is absorbed in the still in vaporization of such components, and frequently in over-cracking of such components, which otherwise would be available for useful cracking. In this respect also the invention makes it possible to reduce the amount of heat necessary to be transferred through walls of the pressure still to effect any given conversion of a particular stock of this type or conversely to increase the capacity of the pressure still. The invention has another advantage in that the apparatus for cooling the components of the pitch-laden oil, in accordance with the invention, can be made compact and of a type easily maintained; a tower with direct heat exchange between vapors from the pitch-laden oil and fresh charging stock or other condensing agent can be made less cumbersome and can be kept in operation more easily than water cooled condensers of conventional construction of adequate size to condense the vapors resulting from expansion of the oil, or than coolers of conventional construction to bring the withdrawn oil to a sufficiently low temperature to handle without vaporization.

We claim:

1. In processes of cracking higher boiling hydrocarbon oils to produce lower boiling hydrocarbon oils by distillation under pressure at cracking temperatures in which unvaporized oil is withdrawn during the pressure distillation and subjected to further vaporization by its self-contained heat under a reduced pressure, the improvement which comprises passing the vapors separated from the oil withdrawn from the pressure distillation into a tower, introducing fresh oil directly into the vapor space in this tower, so as to bring the fresh oil and vapors into direct and intimate contact therein, thereby subjecting the vapors to condensation, passing the vapors from the pressure still into a reflux tower and introducing admixed condensate and unvaporized fresh oil from the first mentioned tower into direct contact with the vapors therein, and returning reflux together with admixed unvaporized oil from the said reflux tower to the pressure distillation.

2. In processes of cracking higher boiling hydrocarbon oils to produce lower boiling hydrocarbon oils by distillation under pressure at cracking temperatures in which unvaporized oil is withdrawn during the pressure distillation and subjected to further vaporization by its self-contained heat under a reduced pressure, the improvement which comprises passing the vapors separated from the oil withdrawn from the pressure distillation into a tower, introducing fresh oil directly into the vapor space in this tower so as to bring the fresh oil and vapors into direct and intimate contact therein, thereby subjecting the vapors to condensation, passing the vapors from the pressure still into a reflux tower and introducing admixed condensate and unvaporized fresh oil from the first mentioned tower while still in a heated state therefrom into direct contact with the vapors in the said reflux tower, and returning reflux together with admixed unvaporized oil introduced into the said reflux tower to the pressure distillation.

3. In processes of cracking higher boiling hydrocarbon oils to produce lower boiling hydrocarbon oils by distillation under pressure at cracking temperatures in which unvaporized oil is withdrawn during the pressure distillation and subjected to further vaporization by its self-contained heat under a reduced pressure, the improvement which comprises passing the vapors separated from the oil withdrawn from the pressure distillation into a tower, introducing fresh oil directly into the vapor space in this tower so as to bring the fresh oil and vapors into direct and intimate contact therein, thereby subjecting the vapors to condensation, and suplying admixed condensate and unvaporized fresh oil from this tower to the pressure distillation without substantial reduction in temperature.

EUGENE C. HERTHEL.
THOMAS DE COLON TIFFT.

DISCLAIMER 1,677,773.—*Eugene C. Herthel* and *Thomas De Colon Tifft*, Chicago, Ill. ART OF CRACKING HYDROCARBON OILS. Patent dated July 17, 1928. Disclaimer filed April 9, 1932, by the patentees, assignee, *Sinclair Refining Company*, consenting.

Hereby enter this disclaimer of the subject matter of claims, 1, 2, and 3 of said specification excepting the improvements in cracking higher boiling hydrocarbon oils described in claims 1, 2 and 3 of said specification as limited to processes:

Wherein the "distillation under pressure" recited in the claims is a primary pressure distillation to which is supplied at least some fresh oil;

Wherein the pressure on the unvaporized oil that "is withdrawn during the pressure distillation and subjected to further vaporization by its self-contained heat" is reduced from the pressure at which the primary pressure distillation is effected in a single stage and without intermediate distillation to a pressure lower than the pressure maintained in said "distillation under pressure" by an amount sufficient to produce vaporization of a substantial part of said "oil withdrawn during the pressure distillation" by its self-contained heat.

Wherein a condensate is formed in the tower into which "vapors separated from the oil withdrawn from the pressure distillation" are passed, and such condensate at least in part is discharged from said tower without again mixing with the portion of the said oil "withdrawn during the pressure distillation" remaining unvaporized;

And, wherein the said "further vaporization" of unvaporized oil withdrawn from the primary pressure distillation is effected entirely or substantially entirely by its "self-contained heat."

[*Official Gazette May 10, 1932.*]